United States Patent Office 3,136,633
Patented June 9, 1964

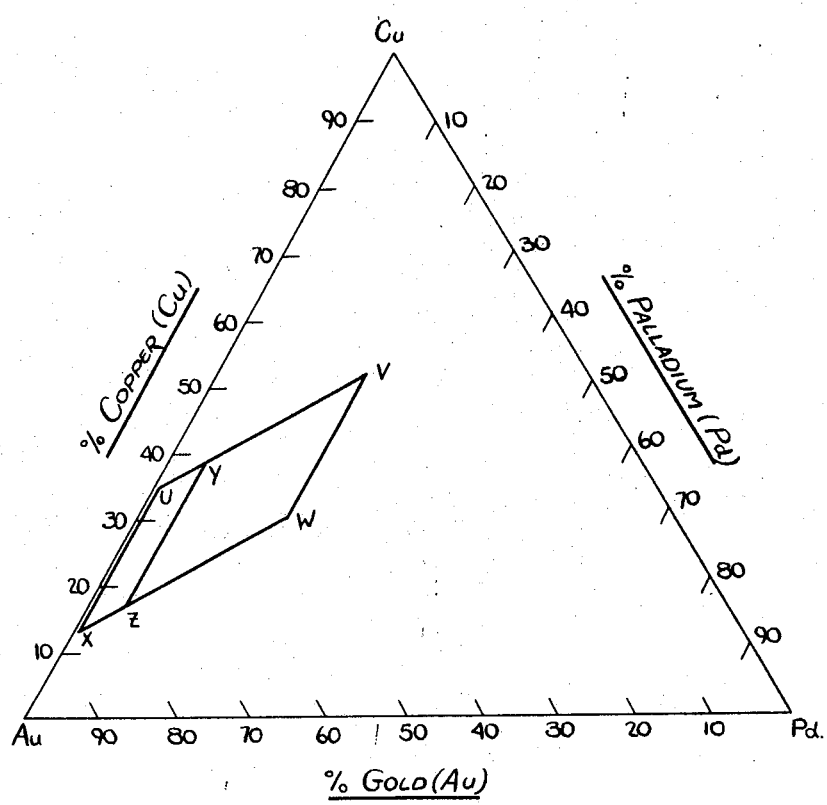

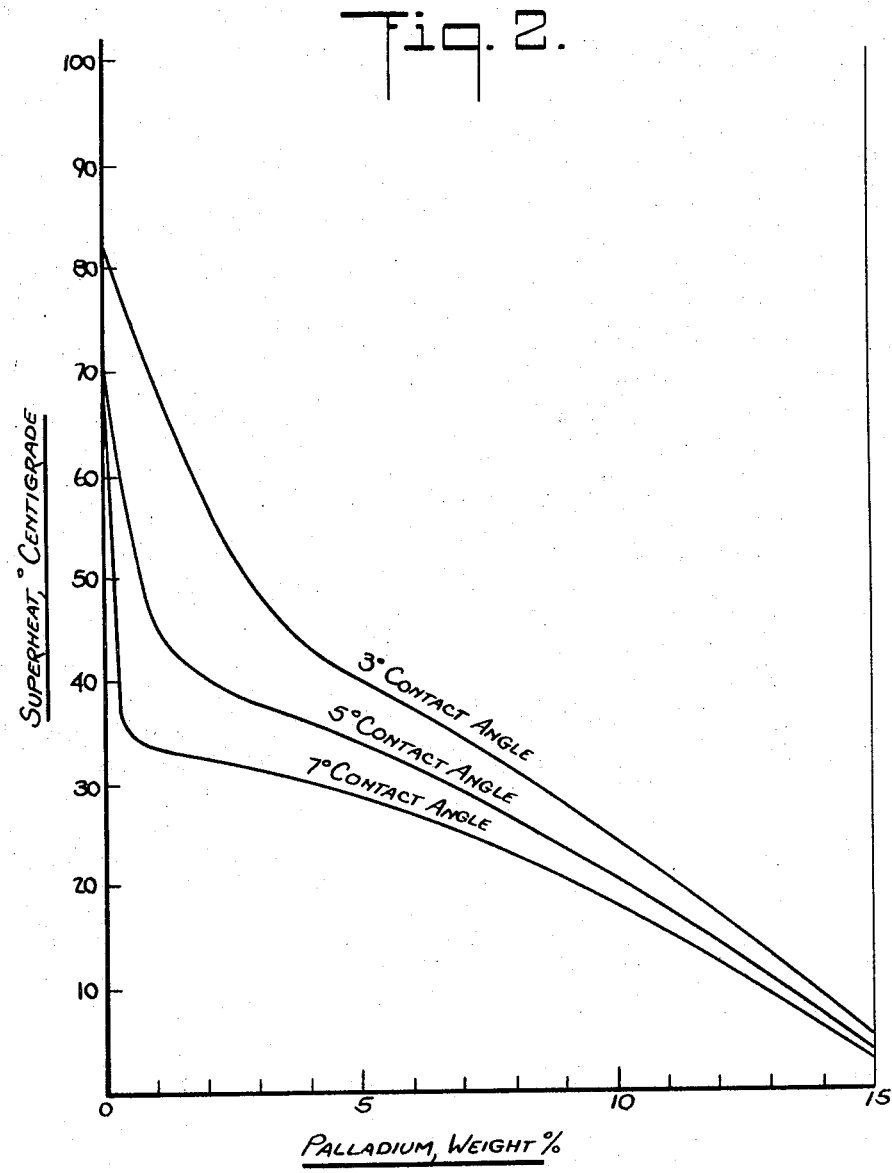

3,136,633
Au-Cu-Pd BRAZING ALLOY
Roy D. Berry, High Wycombe, England, assignor to The International Nickel Company, Inc., New York, N.Y., a corporation of Delaware
Filed July 23, 1962, Ser. No. 211,529
Claims priority, application Great Britain Aug. 15, 1961
7 Claims. (Cl. 75—165)

The present invention relates to alloys and, more particularly, to brazing alloys.

It is well known that alloys, in order to be useful as brazing materials, should have certain properties and/or characteristics. One of the properties and/or characteristics is the ability of the alloy to wet the surfaces of the base metals to be joined. Secondly, the alloy should have good fluidity at the brazing temperature, i.e., it should have the ability to flow and distribute the melting alloy into the joint between the base metals by capillary action. Thirdly, the melting point or melting range of the alloy to be used as the brazing material should be compatible with the base metals which are to be joined thereby. Fourthly, the alloy should have a composition that is relatively free of excessively volatile and/or toxic constituents. Fifthly, the intended brazing material should have a composition that is not susceptible to liquation, i.e., the portion of the alloy which melts first oftentimes has a different composition than the remaining portion of the alloy and this phenomenon is called "liquation." Sixthly, the brazing alloy should be non-aggressive to the base metals. Finally, the brazing alloy should possess suitable mechanical and physical properties. In general, each of the foregoing properties and/or characteristics should be present at the same time whenever an alloy is to be used as a brazing filler metal.

The attainment of materials having the requisites of a good brazing alloy is difficult to obtain under even the mildest of conditions. However, the difficulties become magnified whenever the brazing alloys are used for joining contaminant-sensitive materials especially when such materials are to be employed at high temperatures. For example, some brazing alloys are used for joining parts, components, etc., which subsequently are heated to temperatures above about 850° C. In particular, in the electronic industry, valves and similar components containing molybdenum, tungsten and/or alloys of at least one of these metals which must be brazed are heated to above about 850° C. after the brazing operation in order to drive off undesirable contaminants. Thus, the brazed joints must, of course, be able to withstand the high temperatures employed in such operations.

Hitherto, binary alloys of gold and copper have been used by the art for brazing alloy components containing molybdenum and/or tungsten. The melting ranges of some of these alloys, particularly those alloys containing between 13 and 35% copper, are so low as to render them unsuitable when temperatures over about 850° C. are encountered. While increasing the proportion of copper does raise the melting range (at least the solidus) of the gold-copper alloys, new disadvantages arise. For example, the ability of alloys with a higher proportion of copper to flow and therefore wet the metal in a satisfactory way is decreased. One measure of this ability to flow is the contact angle formed between the molten brazing alloy and the surface of the base metal or metals in contact therewith. In general, the contact angle decreases as the temperature rises above solidus, and in practice it is desirable that the contact angle be below about 5°, and that this low contact angle should be achieved at a temperature not more than about 50° C. above the liquidus temperature. Thus, what is required by the art is a brazing material having a higher solidus together with increased ability to flow and to wet the surface of metals such as tungsten and molybdenum.

Although many attempts were made to overcome the foregoing difficulties and other disadvantages, none, as far as I am aware, was entirely successful when carried into practice commercially on an industrial scale.

It has now been discovered that brazing alloys having a high solidus temperature and a narrow melting range and having increased flowability and wettability may now be produced.

It is an object of the present invention to provide novel alloys having a unique combination of properties and/or characteristics.

Another object of this invention is to provide brazing alloys which are particularly adapted for use in the joining of base metals containing molybdenum, tungsten and/or alloys of at least one of these metals.

The invention also contemplates providing new brazing alloys having good flowing and wetting properties and/or characteristics in combination with high solidus temperatures and relatively narrow melting ranges.

It is a further object of the invention to provide a special process for joining base metals by brazing to provide joints that have good high temperature properties and/or characteristics.

Among the further objects of the present invention is the provision of a novel process for joining base metals, made of molybdenum, tungsten and/or alloys of at least one of these metals, by brazing.

Other objects and advantages will become apparent from the following description taken in conjunction with the accompanying drawings in which:

FIGURE 1 is a ternary diagram diagrammatically showing the ranges of ingredients of the brazing alloys of the present invention; and FIGURE 2 is a graph depicting the variation of superheat (temperature above the liquidus) with composition to produce specific contact angles.

Generally speaking, the present invention contemplates unique brazing alloys containing gold, copper and palladium. According to this invention, the ternary brazing alloy has a composition falling within the area bounded by the lines U–V–W–X–U in FIGURE 1 of the accompanying drawing which shows diagrammatically the ranges, in percent by weight, of gold, copper and palladium. Thus, these alloys contain, by weight, from about 28% to about 87.5% gold, from about 12% to about 52% copper and from about 0.5% to about 20% palladium being so correlated and/or coordinated that the composition falls within the area U–V–W–X–U. The inclusion of the palladium in what is otherwise a binary gold-copper alloy increases the ability of the alloy to flow (and thereby wet the base metal to be brazed) very considerably as will be shown hereinafter. These alloys have a solidus range of about 900° C. to about 1150° C. and a liquidus range of about 910° C. to about 1200° C.

Each of the elements gold, copper and palladium is present in the alloys of the present invention within the ranges specified so that there is an assurance that the alloys have a solidus temperature of about 900° C. or higher together with a narrow melting range and have good flowability and wettability characteristics. Thus, when the alloys contain more gold and less copper than alloys on the line X–Z–W, the alloys suffer from the disadvantage of being too weak to withstand stresses which may be placed upon them during service, and they have inferior wettability, further their liquidus-solidus gap may be larger than that for alloys within the invention.

When the alloys contain more copper and less gold than alloys on the line U–Y–V the brazing properties and/or characteristics are adversely affected since the alloys have less oxidation resistance and higher vapour pressure. They may have a greater liquidus-solidus gap, and also inferior wettability. Palladium is present in the ranges hereinbefore set forth since it increases the flowability and wettability of the alloys as is shown hereinafter. However, when the palladium content is greater than 20%, i.e., greater than that of alloys on the line V–W, the alloys will have too high a liquidus temperature and depending on the proportions of gold and copper may have a greater liquidus solidus gap. When the palladium content is below the minimum of 0.5%, the amount of palladium present is not sufficient to produce the desired improvement in flowability and the alloys have too low a solidus temperature to withstand the service temperature. Advantageously, the palladium content is at least about 5% and then the alloys have a desirably high solidus temperature, e.g., at least about 940° C., while also having a relatively small melting range together with excellent ability to flow. The alloys thus advantageously lie in the area bounded by the lines Y–V–W–Z–Y in FIGURE 1 of the drawing. Thus, these alloys contain, by weight, about 28% to about 79% gold, about 16% to about 52% copper and about 5% to about 20% palladium.

The alloys within the contemplation of the present invention have a contact angle of 7° at temperatures that are less than about 35° C. above the liquidus temperature which permits quicker brazing as well as substantially inhibiting the formation of intermetallic components with the base metal. The contact angle is measured by setting a point micrometer at 0.005 inch and 0.01 inch above the thickness of the sheet to be brazed. The brazing alloy is then heated for about 10 minutes in a protective atmosphere until it begins to form a bead. Contour lines are thereafter scribed around the flowed bead at 0.005 inch and 0.01 inch from the sheet. The lateral distances of the 0.005 inch and 0.01 inch lines from the edge of the bead are measured in eight places and from the average readings the contact angles are calculated, i.e., by dividing the micrometer settings by the lateral distances as measured the tangent of the angle is obtained.

Naturally, the alloys may include certain incidental elements in the amounts usual in gold-copper alloys. For example, the alloys may contain, by weight, up to about 0.5% manganese, up to about 0.1% aluminium, up to about 0.5% zinc, up to about 0.5% cadmium, up to about 0.5% lithium, and up to about 0.05% boron. In addition, the alloys of the present invention contain less than about 1% rhodium, less than about 5% nickel, less than about 1% silver, less than about 1% platinum, less than about 0.05% lead and less than about 0.02% of each of the following elements bismuth, arsenic, selenium, tellurium and sulphur, since these elements, when present in amounts greater than the maxima hereinbefore set forth are detrimental to the brazing properties and/or characteristics of the alloys within the scope of the present invention. For instance, these elements deleteriously affect the solidus temperature of the alloy and decrease its beneficial flowability and/or wettability properties and/or characteristics. Moreover, such elements as boron, arsenic, selenium, tellurium and sulphur are aggressive to certain base metals, in that they penetrate the grain boundaries of the base metals so producing embrittlement.

The total of all elements other than gold, copper and palladium must be less than about 7% by weight of the alloy.

In carrying the invention into practice it is highly desirable that the temperature difference between the point at which the alloy just begins to flow and that at which it flows so readily that the contact angle is low, e.g., not over about 7°, should be as small as possible. This temperature difference decreases with increases in the palladium content but is also dependent on the gold and copper contents. This temperature difference is low in alloys having a composition falling within the area delineated by the coordinates U–V–W–X–U in FIGURE 1 of the drawing and is between about 5° C. and about 35° C. Those alloys having a composition within the area Y–V–W–Z–Y in FIGURE 1 of the drawing are even more advantageous since they have even a lower temperature difference, i.e., between about 5° C. and about 30° C. The coordinates for the foregoing points are set forth in Table I.

*Table I*

| Coordinates | Percent Gold | Percent Copper | Percent Palladium |
|---|---|---|---|
| U | 65.5 | 34 | 0.5 |
| V | 28 | 52 | 20 |
| W | 50 | 30 | 20 |
| X | 87.5 | 12 | 0.5 |
| Y | 57 | 38 | 5 |
| Z | 79 | 16 | 5 |

To illustrate the improvement a comparison may be made between a binary alloy containing about 80% gold and about 20% copper and an alloy according to the invention containing about 78% gold, about 21% copper and about 1% palladium (Alloy A). The binary alloy just starts to melt at about 915° C. and the ternary alloy starts to melt at a very slightly higher temperature. At 960° C. the binary alloy has a relatively high contact angle of 12°. On the other hand, the ternary alloy has only a 5° contact angle. In addition, the alloy containing about 78% gold, about 21% copper and about 1% palladium has a solidus temperature of about 909° C. and a liquidus temperature of only about 920° C.

The advantage of increasing the palladium content is shown by a comparison made between a binary alloy containing about 56% gold and about 44% copper and two ternary alloys within the contemplation of this invention, one containing about 70% gold, about 25% copper and about 5% palladium (Alloy B) and having a solidus temperature of about 940° C. and a liquidus temperature of about 967° C. and the other containing about 51% gold, about 34% copper and about 15% palladium (Alloy C). The last mentioned alloy has a solidus temperature of about 998° C. and a liquidus temperature of about 1031° C. The binary alloy begins to flow at 960° C. and so does the ternary alloy containing 5% palladium. The binary alloy still has the contact angle of 7° at 1120° C. whereas the ternary alloy containing 5% palladium reaches a contact angle of only 3° even at the lower temperature of 1000° C. and the ternary alloy containing 15% palladium begins to flow at about 1035° C. and reaches a contact angle of only 3° at about 1040° C. and a contact angle of zero at about 1045° C. To further illustrate the effect of variations in palladium content on gold-copper brazing alloys, a number of gold-copper alloys with and without palladium were prepared and the amount of superheat necessary to provide contact angles of 3°, 5° and 7° was determined and the results were plotted on FIGURE 2. The alloys lie on a line drawn on FIGURE 1 from 80% gold, 20% copper to 59% copper, 41% palladium. In this figure, the abscissa is the percentage of palladium and the ordinate is the superheat temperature in degrees centigrade. Thus, from FIGURE 2 it is clear that these low contact angles, i.e., less than 7° at a superheat of less than about 35° C., of the gold-copper alloys containing palladium as hereinbefore set forth are illustrative of the fact that the ternary brazing alloys of the invention are characterized by improved flowability and wettability properties and/or characteristics as compared to the prior binary copper-gold brazing alloys.

The brazing may be effected using the advantageous vacuum brazing technique because the alloys of this invention have a lesser tendency to volatilize than the prior alloys. Of, course, other brazing techniques may be used as those skilled in the art will readily understand. For instance, the brazing operations may be conducted under a borax type flux, or in a reducing atmosphere such as hydrogen, or the brazing may be conducted using induction brazing techniques in argon. In general, when brazing base materials such as molybdenum and molybdenum-base alloys, the base material can be cleaned prior to brazing by an abrasive operation followed by degreasing. Or, the molybdenum base metal may be etched with a suitable etchant such as one containing sulfuric acid, hydrofluoric acid, nitric acid and chromic acid.

The brazing alloys of this invention can be worked into suitable shapes without great difficulty. For example, Alloy B was cold-drawn to 0.029 inch diameter wire while another 5% palladium alloy of like composition was cold-rolled to a section having a cross-section of 0.08 inch by 0.08 inch. Furthermore, still another alloy having a composition as Alloy B was hot-rolled to 0.002 inch foil as was Alloy C containing 15% palladium. This property of being so workable is advantageous because it is common practice to form the alloys into strips or the like which are used as shims between the parts to be joined together. Therefore, it is useful to be able to make these shims easily.

The alloys according to this invention have good stress-rupture properties and/or characteristics. For example, brazed joints were made in stainless steel having a nominal composition of 18% chromium and 8% nickel and were stress-rupture tested at about 500° C. In all, two series of tests were made. One was made with Alloy B and the other was made with Alloy C. The life-to-rupture of 1000 hours was obtained in the joint brazed with Alloy B at a stress of about 1½ long tons per square inch (t.s.i.) while the joint brazed with Alloy C had a 1000 hour life of about 3½ t.s.i. These results are superior to the gold-copper alloys presently used and are more than adequate in the brazing of components containing molybdenum, tungsten and/or alloys of at least one of these metals.

The present invention is particularly applicable to the brazing of parts, components, etc., which are intended for service at temperatures, e.g., above about 850° C. but below the solidus temperature of the brazing alloy and which contain up to 100% molybdenum, up to 100% tungsten, and which are made from nickel-iron and other low expansion alloys, stainless steels; nickel-chromium, nickel-chromium-cobalt base heat resistant alloys; cupro-nickel alloys and other copper alloys, and also for jointing ceramic parts when coated with inter alia a molybdenum layer. Thus, the invention specifically includes the brazing of components of tungsten or molybdenum or a tungsten alloy or a molybdenum alloy to the same metal or alloy or a similar alloy or another alloy by means of a brazing alloy as defined especially since the brazing alloys herein defined are substantially non-aggressive to such base metals and do not readily form brittle intermetallic compounds therewith either during brazing or in service at temperatures of about 700° C. or higher. In addition, the rapid decrease in contact angle and increased ability to flow of the alloys according to the invention are particularly useful when brazing complicated assemblies in which the alloy must flow for some distance before entering a narrow space in which it comes under capillary action, or in which it must flow through different distances to enter different parts of the joint.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and the appended claims.

I claim:

1. An alloy particularly adapted for the brazing of materials which are subjected to temperatures above about 850° C. which alloy consists essentially, by weight, in addition to impurities and incidental elements, of about 28% to about 87.5% gold, about 12% to about 52% copper and about 0.5% to about 20% palladium with the amount of each of gold, copper and palladium being so correlated that the composition of the alloy falls within the area U–V–W–X–U in FIGURE 1 of the accompanying drawing, said incidental elements including up to about 0.5% manganese, up to about 0.1% aluminum, up to about 0.5% zinc, up to about 0.5% cadmium, up to about 0.5% lithium, up to about 0.05% boron, less than about 1% rhodium, less than about 5% nickel, less than about 1% silver, and less than about 1% platinum, the total amount of all elements other than gold, copper and palladium being less than about 7% of the weight of the alloy.

2. An alloy particularly adapted for the brazing of materials which are subjected to temperatures above about 850° C. which alloy consists essentially, by weight, in addition to impurities and incidental elements, of about 28% to about 79% gold, about 16% to about 52% copper and about 5% to about 20% palladium with the amount of each of gold, copper and palladium being so correlated that the composition of the alloy falls within the area Y–V–W–Z–Y in FIGURE 1 of the accompanying drawing, said incidental elements including up to about 0.5% manganese, up to about 0.1% aluminum, up to about 0.5% zinc, up to about 0.5% cadmium, up to about 0.5% lithium, up to about 0.05% boron, less than about 1% rhodium, less than about 5% nickel, less than about 1% silver, and less than about 1% platinum, the total amount of all elements other than gold, copper and palladium being less than about 7% of the weight of the alloy.

3. An alloy particularly adapted for the brazing of materials which are subjected to temperatures above about 850° C. which alloy consists essentially by weight of about 78% gold, about 21% copper and about 1% palladium.

4. An alloy particularly adapted for the brazing of materials which are subjected to temperatures above about 850° C. which alloy consists essentially by weight of about 70% gold, about 25% copper and about 5% palladium.

5. An alloy particularly adapted for the brazing of materials which are subjected to temperatures above about 850° C. which alloy consists essentially by weight of about 51% gold, about 34% copper and about 15% palladium.

6. A process for brazing at least two metallic base members, at least one of said members being made of a heat resistant metal selected from the group consisting of molybdenum, tungsten, alloys of molybdenum and alloys of tungsten comprising preparing a joint between said base members, melting and flowing into said joint a brazing alloy consisting essentially of about 28% to about 87.5% gold, about 12% to about 52% copper and about 0.5% to about 20% palladium with the amount of each of gold, copper and palladium being so correlated that the composition falls within the area U–V–W–X–U in FIGURE 1 of the accompanying drawing at a brazing temperature that is less than 35° C. higher than the temperature at which the said brazing alloy starts to flow and thereafter solidifying the brazed joint thus produced.

7. A process for brazing at least two metallic base members, at least one of said members being made of a heat resistant metal selected from the group consisting of molybdenum, tungsten, alloys of molybdenum and alloys of tungsten comprising preparing a joint between said base members, melting and flowing into said joint a brazing alloy consisting essentially of about 28% to about 79% gold, about 16% to about 52% copper and about 5% to about 20% palladium with the amount of each of gold, copper and palladium being so correlated that the composition falls within the area Y–V–W–Z–Y in FIGURE 1 of the accompanying drawing at a brazing temperature that is less than about 35° C. higher than the temperature at which the said brazing alloy starts to flow and thereafter solidifying the brazed joint thus produced.

References Cited in the file of this patent
UNITED STATES PATENTS

| | | |
|---|---|---|
| 1,165,448 | Richter | Dec. 28, 1915 |
| 1,779,602 | Richter | Oct. 28, 1930 |

FOREIGN PATENTS

| | | |
|---|---|---|
| 734,840 | Great Britain | Aug. 10, 1955 |